US012568566B2

(12) United States Patent
Maa et al.

(10) Patent No.: US 12,568,566 B2
(45) Date of Patent: Mar. 3, 2026

(54) COLOR TEMPERATURE FUSION LIGHTING APPARATUS

(71) Applicant: Aleddra Inc., Renton, WA (US)

(72) Inventors: Chia-Yiu Maa, Bellevue, WA (US); Chun-Te Yu, Bellevue, WA (US)

(73) Assignee: Aleddra Inc., Renton, WA (US)

( * ) Notice: Subject to any disclaimer, the term of this patent is extended or adjusted under 35 U.S.C. 154(b) by 82 days.

(21) Appl. No.: 18/829,001

(22) Filed: Sep. 9, 2024

(65) Prior Publication Data

US 2024/0431007 A1 Dec. 26, 2024

Related U.S. Application Data

(63) Continuation-in-part of application No. 18/626,148, filed on Apr. 3, 2024, which is a continuation-in-part of application No. 18/613,079, filed on Mar. 21, 2024, which is a continuation-in-part of application No. 18/408,523, filed on Jan. 9, 2024, now Pat. No. 12,507,332, and a continuation-in-part of application No. 18/101,569, filed on Jan. 25, 2023, now Pat. No. 12,127,314.

(51) Int. Cl.
*H05B 47/17* (2020.01)
*H05B 45/20* (2020.01)

(52) U.S. Cl.
CPC ............ *H05B 47/17* (2020.01); *H05B 45/20* (2020.01)

(58) Field of Classification Search
CPC ...... H05B 45/10; H05B 45/20; H05B 45/325; H05B 45/3578; H05B 45/36; H05B 45/3725; H05B 45/375; H05B 45/38; H05B 45/385; H05B 45/60; H05B 47/175; H05B 45/24; H05B 45/395; H05B 47/105; H05B 47/11; H05B 47/16; H05B 47/19
See application file for complete search history.

(56) References Cited

U.S. PATENT DOCUMENTS

2010/0001648 A1* 1/2010 De Clercq ............ H05B 45/20 315/294
2017/0105265 A1* 4/2017 Sadwick ............... H05B 45/60

* cited by examiner

*Primary Examiner* — Monica C King
(74) *Attorney, Agent, or Firm* — Andy M. Han; Han IP PLLC

(57) ABSTRACT

A lighting apparatus includes a first light source with a first color temperature, a second light source with a second color temperature, and a control module. The control module operates the lighting apparatus in two modes. In the first mode, the control module operates the lighting apparatus in a first linear combination of two light sources, resulting in a first operating color temperature for the lighting apparatus. In the second mode, the control module operates the lighting apparatus in a second linear combination of two light sources, resulting in a second operating color temperature. The control module is configured to alternate the operation of the lighting apparatus between the first mode and the second mode at a frequency between 35 to 45 Hz, resulting in a blended color. Additional technical features a are introduced to minimize the light output difference of the first light source and the second light source.

20 Claims, 5 Drawing Sheets

COLOR TEMPERATURE FUSION LIGHTING APPARATUS

CROSS REFERENCE TO RELATED PATENT APPLICATIONS

The present disclosure is a continuation-in-part (CIP) of U.S. patent application Ser. No. 18/101,569, filed 25 Jan. 2023, and a CIP of U.S. patent application Ser. No. 18/626,148, filed 3 Apr. 2024, which itself is a CIP of U.S. patent application Ser. No. 18/613,079, filed 21 Mar. 2024, which is itself is a CIP of U.S. patent application Ser. No. 18/408,523, filed 9 Jan. 2024. Content of aforementioned applications are herein incorporated by reference in their entirety.

BACKGROUND

Technical Field

The present disclosure pertains to the field of lighting apparatuses and, more specifically, proposes a color temperature fusion lighting apparatus.

Description of Related Art

It has been discovered that by flickering a light at a frequency between 35 Hz to 45 Hz or generating a sound at a similar frequency has the effect of stimulating the cells in certain region of the brain, resulting in using a flicking light or a sound at such a frequency for treating Alzheimer's disease. However, turning on and off a light source at a frequency between 35 Hz to 45 Hz can create visual discomfort to the eyes of a subject. Different approaches have been introduced to overcome this visual discomfort under 40 Hz flickering light.

In U.S. patent application Ser. No. 18/101,569, a color temperature fusion lighting apparatus was introduced. It includes a first light source with a first color temperature, a second light source with a second color temperature, and a control module. The control module operates the lighting apparatus in two modes. In the first mode, the control module operates the lighting apparatus in a first linear combination of the first light source and the second light source, resulting in a first operating color temperature for the lighting apparatus. In the second mode, the control module operates the lighting apparatus in a second linear combination of the first light source and the second light source, resulting in a second operating color temperature. Moreover, the control module is configured to alternate the operation of the lighting apparatus between the first mode and the second mode at a frequency F between 35 to 45 Hz, resulting in a blended color temperature of the first operating color temperature and the second operating color temperature for the lighting apparatus.

Experiments show that the visible flickering of the color temperature fusion lighting apparatus is highly sensitive to the light output discrepancy in the first mode and the second mode. For example, if the first light source comprises 3500K LED and the second light source comprises 4500K LED, and only 3500K LED is on in the first mode and only 4500K LED is on in the second mode, there is still visible flickering at 40 Hz frequency even when both 3500K LED and 4500K LED are driven by the same amount of power. This is because the natural efficacy of 4500K LED is higher than that of 3500K LED by about 3%, and thus the light output in the second mode and brighter than the light output in the first mode for about 3%. There is a need to compensate the light output difference (due to efficacy difference) of the first and the second light sources appropriately such that the light outputs in the first mode and the second mode will be almost the same (within 1% difference) in order to minimize the visible flickering.

The present disclosure proposes a color temperature fusion lighting apparatus with various technical features for minimizing the light output difference in the first and the second modes or the light output difference of the first light source and the second light source.

SUMMARY

In one aspect, the lighting apparatus comprises a first light source with a first color temperature CT1, a second light source with a second color temperature CT2, different from the first color temperature CT1, and a control module. The control module is configured to operate the lighting apparatus in two modes: the first mode and the second mode. In first mode, the driver is configured to operate the lighting apparatus in a first linear combination of the first light source and the second light source, resulting in a first operating color temperature OCT1 for the lighting apparatus (i.e., OCT1≈X1*CT1+Y1*CT2, where X1+Y1=100%). Note that the color temperature scale is nonlinear, so the linear combination representation of two color temperatures is only an approximation. In the second mode, the driver is configured to operate the lighting apparatus in a second linear combination of the first light source and the second light source, different from the first linear combination, resulting in a second operating color temperature OCT2 for the lighting apparatus, different from the first operating color temperature OCT1 (i.e., OCT2≈X2*CT1+Y2*CT2, where X2+Y2=100%, X1≠X2, and Y1≠Y2). The difference between the first operating color temperature OCT1 and the second operating color temperature OCT2 is greater than 100 Kelvin. This is so that there is sufficient color temperature difference to trigger the stimulation of the ipRGCs. Moreover, the control module is configured to alternate the operation of the lighting apparatus between the first mode and the second mode at a frequency F between 30 to 45 Hz, resulting in a blended color temperature (or a color temperature fusion) for the light apparatus equal to (OCT1+OCT2)/2. Lastly, light outputs of the lighting apparatus operating in the first mode and in the second mode are within 3% difference. The less than 3% difference of light outputs in the first mode and the second mode is achievable by carefully choosing the first light source and the second light source to have very similar efficacy (lumen/watt) and electrical characteristics. Thus, the control module can drive the first light source and the second light source with the same amount of power for achieving less than 3% difference of light outputs in the first mode and the second mode.

To have similar efficacy and electrical characteristics for the first light source and the second light source is feasible when CT1 and CT2 are not too far apart, say, within 200K. It would be challenging to have similar efficacy and electrical characteristics for the first light source and the second light source when CT1 and CT2 is more than 300K or 500K apart. It needs a more proactive approach to compensate for larger temperature differences of the first light source and the second light source.

In another aspect, the lighting apparatus comprises a first light source with a first color temperature CT1, a second light source with a second color temperature CT2, different from the first color temperature CT1, and a control module. The control module is configured to operate the lighting apparatus in two modes: the first mode and the second mode. In first mode, the driver is configured to operate the lighting apparatus in a first linear combination of the first light source and the second light source, resulting in a first operating color temperature OCT1 for the lighting apparatus (i.e., OCT1≈X1*CT1+Y1*CT2, where X1+Y1=100%). In the second mode, the driver is configured to operate the lighting apparatus in a second linear combination of the first light source and the second light source, different from the first linear combination, resulting in a second operating color temperature OCT2 for the lighting apparatus, different from the first operating color temperature OCT1 (i.e., OCT2≈X2*CT1+Y2*CT2, where X2+Y2=100%, X1≠X2, and Y1≠Y2). The difference between the first operating color temperature OCT1 and the second operating color temperature OCT2 is greater than 100 Kelvin. Moreover, the control module is configured to alternate the operation of the lighting apparatus between the first mode and the second mode at a frequency F between 30 to 45 Hz, resulting in a blended color temperature for the light apparatus equal to (OCT1+OCT2)/2. Lastly, the control module further comprises a light output tuning submodule (LOTS) configured to tune the light output of the lighting apparatus in either the first mode or the second mode, or both, such that light outputs of the lighting apparatus operating in the first mode and in the second mode are within 1% difference. For example, if the first light source is 4500K LED, the second light source is 3500K LED, and the efficacy of the first light source is 3% higher than that of the second light source. In the first mode, only the first light source is on and in the second mode only the second light source is on. Then, the control module can reduce the power supply to the first light source by 3% as compared to the power supply to the second light source via the LOTS, resulting the light outputs in the first mode and the second mode to be less than 1% difference.

Using LOTS works the best with new light sources where their efficacies are known. However, the light output of all light sources will depreciate over time, and different light sources may experience different light output depreciation. The approach of using LOTS for a fixed compensation on the efficacy difference of the first light source and the second light source while working perfectly when both light sources are new will deteriorate as two light sources experience different light output depreciations. This raises the need for a different solution.

In another aspect, the lighting apparatus comprises a first light source with a first color temperature CT1, a second light source with a second color temperature CT2, different from the first color temperature CT1, a feedback mechanism, and a control module. The control module is configured to operate the lighting apparatus in two modes: the first mode and the second mode. In first mode, the driver is configured to operate the lighting apparatus in a first linear combination of the first light source and the second light source, resulting in a first operating color temperature OCT1 for the lighting apparatus (i.e., OCT1≈X1*CT1+Y1*CT2, where X1+Y1=100%). In the second mode, the driver is configured to operate the lighting apparatus in a second linear combination of the first light source and the second light source, different from the first linear combination, resulting in a second operating color temperature OCT2 for the lighting apparatus, different from the first operating color temperature OCT1 (i.e., OCT2≈X2*CT1+Y2*CT2, where X2+Y2=100%, X1≠X2, and Y1≠Y2). The difference between the first operating color temperature OCT1 and the second operating color temperature OCT2 is greater than 100 Kelvin. Moreover, the control module is configured to alternate the operation of the lighting apparatus between the first mode and the second mode at a frequency F between 30 to 45 Hz, resulting in a blended color temperature for the light apparatus equal to (OCT1+OCT2)/2. The feedback mechanism is configured to sense a first representation of the light output of the lighting apparatus operating in the first mode and a second representation of the light output of the lighting apparatus operating in the second mode. It also derives a difference between the first representation and the second representation, and feedback a signal proportional to the difference to the control module. In response to the signal from the feedback mechanism, the control module is configured to tune the light output of the lighting apparatus in either the first mode or the second mode, or both, such that light outputs of the lighting apparatus operating in the first mode and in the second mode are within 1% difference. A representation of the light output of a light source may be the actual light output (in lumen) of the light source, or it may be the light output of a subset of the light source that can be scaled up to represent the light output of the light source, or it may be a measurement of the power supply (or consumption) of the light source which can be used to calculate the light output of the light source, or it may be the anticipated light output of the light source by factoring in the light output depreciation of the light source, or it may be a combination thereof.

In some embodiments, the feedback mechanism comprises a first sensing module for sensing a first representation of the light output of the lighting apparatus operating in the first mode, a second sensing module for sensing a second representation of the light output of the lighting apparatus operating in the second mode, and a comparator module. The comparator module is configured to receive the first representation and the second representation, to generate a signal proportional to the difference of the first representation and the second representation, and to feedback the signal to the control module. The comparator module here is in a logical sense, not in a physical sense. It is feasible to implement the comparator module via a physical electrical comparator circuit. It is also feasible to implement the comparator module via a more complicated digital subsystem, so long as the comparator module can generate a signal proportional to the difference of its two input signals.

In some embodiments, the feedback mechanism comprises a sensing module, a signal delay mechanism, and a comparator module. The delay mechanism may comprise electric components or it may be more complicated with a local data storage. The sensing module senses representations of the light output of the lighting apparatus operating in the first mode and in the second mode alternately and generates a first signal corresponding to a first representation of light output of lighting apparatus operating in the first mode and a second signal corresponding to a second representation of light output of lighting apparatus operating in the second mode. The first signal is fed through the signal delay mechanism for delaying the first signal by a half of the F frequency cycle, thus creating a delayed first signal. The comparator module is configured to receive the delayed first signal and the second signal, to generate a third signal proportional to the difference of the first representation and the second representation, and to feedback the third signal to the control module.

In some embodiments, the first operating color temperature OCT1 equals the first color temperature CT1 and OCT2 equals CT2. In other words, OCT1≈X1*CT1+

Y1*CT2=CT1, when X1=100% and Y1=0%, and OCT2≈X2*CT1+Y2*CT2=CT2, when X2=0% and Y2=100%.

The discussion of the present disclosure thus far pertains to two light sources operating at the same frequency. The same light output discrepancy issue would also arise when two light sources operate at different frequencies. In another aspect, the lighting apparatus comprises a first light source, a second light source, and a control module. The control module is configured to operate the first light source at F1 frequency with a light output LO1 and the second light source at F2 frequency (F2≠F1) with a light output LO2 simultaneously, and LO1 and LO2 are within 3% difference. The less than 3% difference is achievable by carefully choosing the first light source and the second light source to have very similar efficacy (lumen/watt) and electrical characteristics. Thus, the control module can drive the first light source and the second light source with the same amount of power (albeit at different frequencies) for achieving less than 3% difference of LO1 and LO2.

The first light source and the second light source are not required to have a same color temperature. However, having a same color temperature makes it easier to ensure the light outputs of the first light source and of the second light source are within 1% difference. Therefore, in some embodiments, the first light source and the second light source emit a same color temperature.

When the color temperature of the first light source and the color temperature of the second light source are less than 200K apart, the less than 3% light output difference is achievable by carefully choosing the first light source and the second light source to have very similar efficacy (lumen/watt) and electrical characteristics. However, when the color temperature of the first light source and the color temperature of the second light source are more than 300K or 500K apart, it would need a more proactive approach to compensate their light output difference in order to minimize the flickering. In another aspect, the lighting apparatus comprises a first light source, a second light source, and a control module. The control module is configured to operate the first light source at F1 frequency with a light output LO1 and the second light source at F2 frequency (F2≠F1) with a light output LO2 simultaneously. The control module further comprises a light output tuning submodule (LOTS) configured to tune LO1 or LO2, or both, such that and LO1 and LO2 are within 1% difference. For example, if the first light source is 4500K LED, the second light source is 3500K LED, and the efficacy of the first light source is 3% higher than that of the second light source. The control module can reduce the power supply to the first light source by 3% as compared to the power supply to the second light source via the LOTS, resulting the light outputs in the first light source and the second light source to be less than 1% difference, even when two light sources are operating at different frequencies.

Using LOTS works the best with new light sources where their efficacies are known. However, the light output of all light sources will depreciate over time, and different light sources may experience different light output depreciation. The approach of using LOTS for a fixed compensation on the efficacy difference of the first light source and the second light source while working perfectly when both light sources are new will deteriorate as two light sources experience different light output depreciations. This raises the need for another solution.

In another aspect, the lighting apparatus comprises a first light source, a second light source, a control module, and a feedback mechanism. The control module is configured to operate the first light source at F1 frequency with a light output LO1 and the second light source at F2 frequency (F2+F1) with a light output LO2 simultaneously. The feedback mechanism is configured to sense a first representation of LO1 and a second representation of LO2. It further derives a difference between the first representation and the second representation, and feedback a signal proportional to the difference to the control module. In response to the signal from the feedback mechanism, the control module is configured to tune LO1 or LO2, or both, such that and LO1 and LO2 are within 1% difference. A representation of the light output of a light source may be the actual light output (in lumen) of the light source, or it may be the light output of a subset of the light source that can be scaled up to represent the light output of the light source, or it may be a measurement of the power supply (or consumption) of the light source which can be used to calculate the light output of the light source, or it may be the anticipated light output of the light source by factoring in the light output depreciation of the light source, or it may be a combination thereof.

In some embodiments, the feedback mechanism comprises a first sensing module for sensing a first representation of LO1, a second sensing module for sensing a second representation of LO2, and a comparator module. The comparator module is configured to receive the first representation and the second representation, to generate a signal proportional to a difference of the first representation and the second representation, and to forward the signal to the control module. Since two light sources operate at different frequencies, there will be a time where only the first light source is on and another time where only the second light source is on. These are the times for taking the measurement of the representations of LO1 and LO2. The comparator module here is in a logical sense, not in a physical sense. It is feasible to implement the comparator module via a physical electrical comparator circuit. It is also feasible to implement the comparator module via a more complicated digital subsystem, so long as the comparator module can generate a signal proportional to the difference of its two input signals.

In some embodiments, the feedback mechanism comprises a sensing module, a signal delay mechanism, and a comparator module. The sensing module senses representations of LO1 and LO2 alternately and generates a first signal corresponding to a first representation of LO1 and a second signal corresponding to a second representation of LO2. The first signal is fed through the signal delay mechanism for delaying the first signal, thus creating a delayed first signal. The comparator module is configured to receive the delay first signal and the second signal, to generate a third signal proportional to the difference of the first representation and the second representation, and to forward the third signal to the control module.

In some embodiments, F1≥60 Hz, and F2 is ≥60 Hz.

In some embodiments, the difference between F1 and F2 is between 30 Hz to 45 Hz, e.g., F1=120 Hz & F2=80 Hz.

BRIEF DESCRIPTION OF THE DRAWINGS

The accompanying drawings are included to aid further understanding of the present disclosure and are incorporated in and constitute a part of the present disclosure. The drawings illustrate a select number of embodiments of the present disclosure and, together with the detailed description below, serve to explain the principles of the present disclosure. It is appreciable that the drawings are not necessarily to scale, as some components may be shown to be out of proportion to size in actual implementation in order to clearly illustrate the concept of the present disclosure.

DETAILED DESCRIPTION OF PREFERRED EMBODIMENTS

Overview

Various implementations of the present disclosure and related inventive concepts are described below. It should be acknowledged, however, that the present disclosure is not limited to any particular manner of implementation, and that the various embodiments discussed explicitly herein are primarily for purposes of illustration. For example, the various concepts discussed herein may be suitably implemented in a variety of lighting apparatuses having different form factors.

The present disclosure discloses a lighting apparatus includes a first light source with a first color temperature, a second light source with a second color temperature, and a control module. The control module operates the lighting apparatus in two modes. In the first mode, the control module operates the lighting apparatus in a first linear combination of two light sources, resulting in a first operating color temperature for the lighting apparatus. In the second mode, the control module operates the lighting apparatus in a second linear combination of two light sources, resulting in a second operating color temperature. The control module is configured to alternate the operation of the lighting apparatus between the first mode and the second mode at a frequency between 35 to 45 Hz, resulting in a blended color. Additional technical features a are introduced to minimize the light output difference of the first light source and the second light source.

Example Implementations

Figure 1:
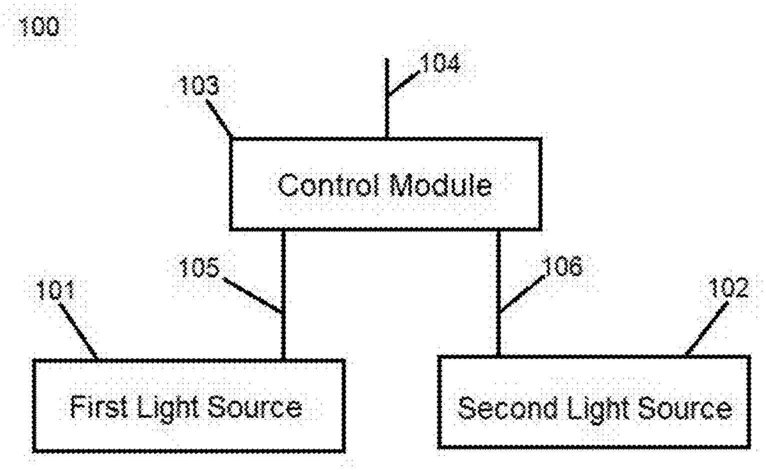
FIG. 1 schematically depicts an embodiment of the present disclosure with both light sources operating at the same frequency.

FIG. 1 is an embodiment of the lighting apparatus of the present disclosure. Embodiment 100 has a first light source 101, a second light source 102, and a control module 103. The first light source 101 comprises 3900K LEDs (i.e., CT1=3900K) and the second light source 102 comprises 4100K LEDs (i.e., CT2=4100K). Control module 103 converts the AC mains 104 into two internal DC powers 105 and 106. The first internal DC power 105 supplies power to drive the first light source 101 and the second internal DC power 106 supplies power to drive the second light source 102. The second internal DC power 106 has a 180-degree phase shift from the first internal DC power 105. Control module 103 operates the lighting apparatus in two modes. In the first mode, only the first light source 101 is turned on (i.e., OCT1=3900K), whereas in the second mode, only the second light source 102 is turned on (i.e., OCT2=4100K). Moreover, control module 103 alternates the operation of the lighting apparatus between the first mode (the first light source) and the second mode (the second light source) at 40 Hz to produce a blended color temperature at 4000K for the light apparatus. By carefully choosing the first light source 101 and the second light source 102 to have very similar efficacies and electrical characteristics, the light outputs of the first light source and of the second light source can be controlled to be within 3% difference.

Figure 2:
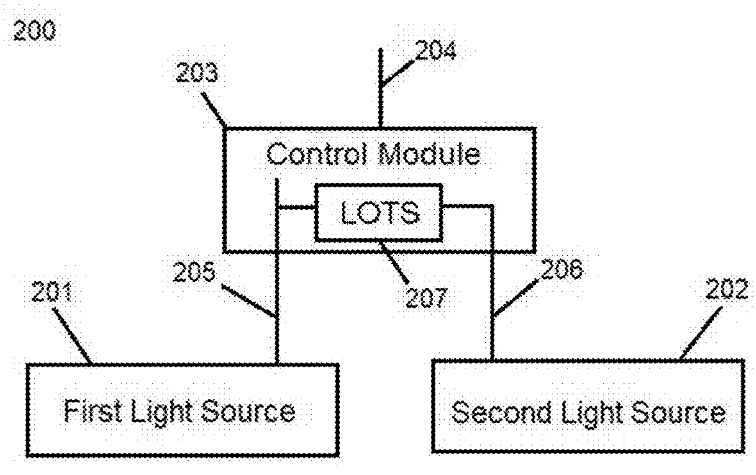
FIG. 2 schematically depicts another embodiment of the present disclosure having a light output tuning submodule (LOTS) with both light sources operating at the same frequency.

FIG. 2 is another embodiment of the lighting apparatus of the present disclosure. Embodiment 200 uses 3800K LEDs as its first light source 201 and 4200K LEDs as its second light source 202. For this embodiment 200, OCT1=3800K and OCT2=4200K. Control module 203 alternates the operation of the lighting apparatus between the first mode (with the first light source 201 on) and the second mode (with the second light source 202 on) at 40 Hz, resulting in a blended color temperature at 4000K for the light apparatus. Moreover, the control module also includes a LOTS module 207. The efficacy of 4200K LED's is about 3% higher than that of 3800K LED's. LOTS module 207 reduces the power supply 206 to the second light source 202 by 3% as compared to the power supply 205 to the first light source 201. As a result, the light output of the first light source 201 will be within 1% difference to the light output of the second light source.

Figure 3:
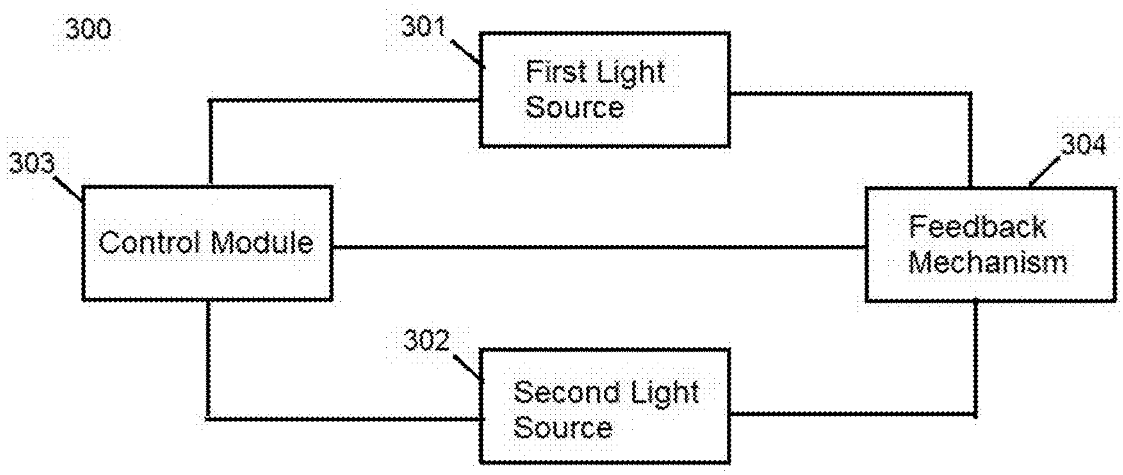
FIG. 3 schematically depicts another embodiment of the present disclosure having a feedback mechanism with both light sources operating at the same frequency.

FIG. 3 is a generic embodiment 300 of the present disclosure with a feedback mechanism. Control module 303 alternates the operation of the lighting apparatus between the first mode (with the first light source 301 on) and the second mode (with the second light source 302 on) at 40 Hz, resulting in a blended color temperature at 4000K for the light apparatus. A feedback mechanism 304 is used to sense a first representation of the light output of the lighting apparatus operating in the first mode and a second representation of the light output of the lighting apparatus operating in the second mode. The feedback mechanism is further configured to derive the difference between the first representation and the second representation and feedback a signal proportional to the difference to the control module 303. In response to the signal from the feedback mechanism 304, control module 303 is configured to tune the light output of the lighting apparatus in either the first mode or the second mode, or both, such that light outputs of the lighting apparatus operating in the first mode and in the second mode are within 1% difference.

Figure 4:
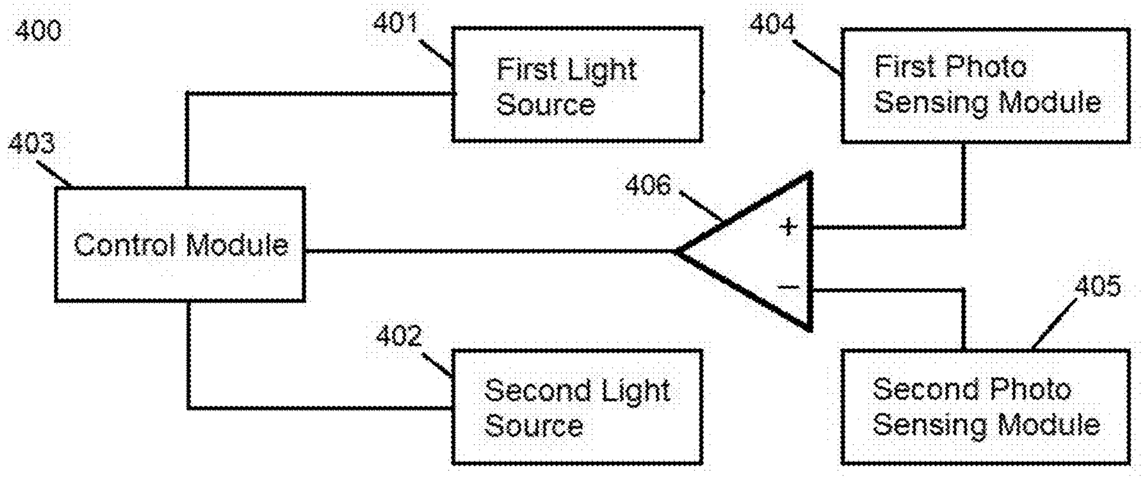
FIG. 4 schematically depicts another embodiment of the present disclosure having two photo sensing modules with both light sources operating at the same frequency.

FIG. 4 is another embodiment of the lighting apparatus of the present disclosure. For embodiment 400, this lighting apparatus uses 3800K LEDs as its first light source 401 and 4200K LEDs as its second light source 402. For this embodiment, OCT1=3800K and OCT2=4200K. Control module 403 alternates the operation of the lighting apparatus between the first mode (with the first light source on) and the second mode (with the second light source on) at 40 Hz, resulting in a blended color temperature at 4000K for the light apparatus. Embodiment 400 uses a first photo sensing module 404 for sensing the light output of the first light source 401 to generate a first signal and a second photo sensing module 405 for sensing the light output of the second light source 402 to generate a second signal. Comparator module 406 receives the first signal and the second signal, generates a third signal proportional to the difference between the first signal and the second signal, and sends the third signal to control module 403. In response to the third signal from the comparator module 406, control module 303 tunes the light output of the first light source or the second light source, or both, such that light outputs of the first light source and of the second light source are within 1% difference.

Figure 5:
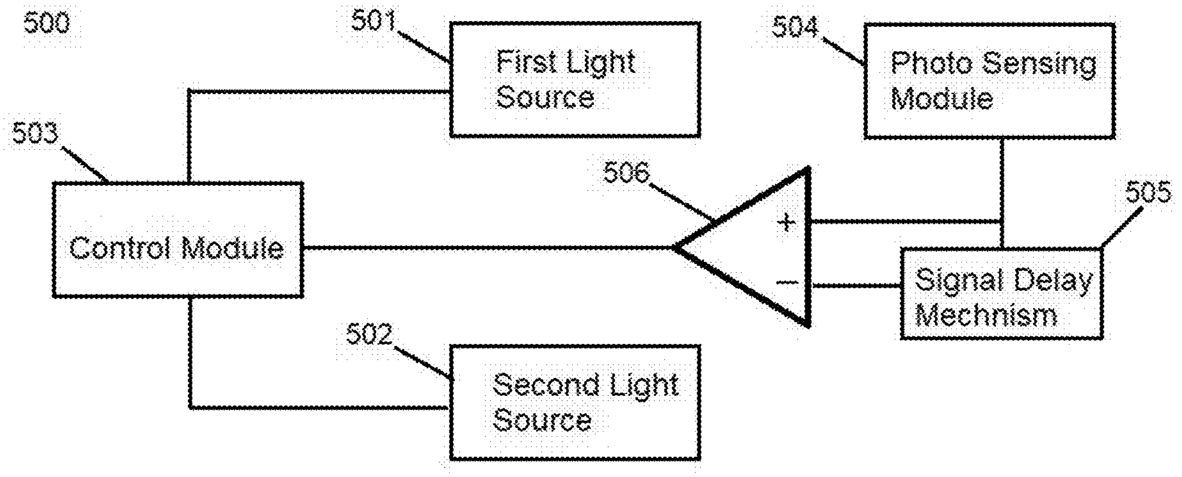
FIG. 5 schematically depicts another embodiment of the present disclosure having one photo sensing module and a signal delay mechanism with both light sources operating at the same frequency.

FIG. 5 is another embodiment of the lighting apparatus of the present disclosure. For this embodiment, it uses 3800K LEDs as its first light source 501 and 4200K LEDs as its second light source 502. For this embodiment, OCT1=3800K and OCT2=4200K. Control module 503 alternates the operation of the lighting apparatus between the first mode and the second mode at 40 Hz, resulting in a blended color temperature at 4000K for the light apparatus. Photo sensing module 504 senses the light outputs of the lighting apparatus operating in the first mode and in the second mode alternately, and generates a first signal corresponding to the light output of lighting apparatus operating in the first mode (with the first light source on) and a second signal corresponding to the light output of lighting apparatus operating in the second mode (with the second light source on). The first signal is fed through a signal delay mechanism 505 for delaying the first signal by a half of the F frequency cycle, i.e., 1/80 second, thus creating a delayed first signal. Comparator module 506 receives the delayed first signal and the second signal, generates a third signal proportional to the difference between the first signal and the second signal, and feeds the third signal to control module 503 for tuning the first light source or the second light source, or both, such that light outputs of the first light source and of the second light source are within 1% difference.

Figure 6:
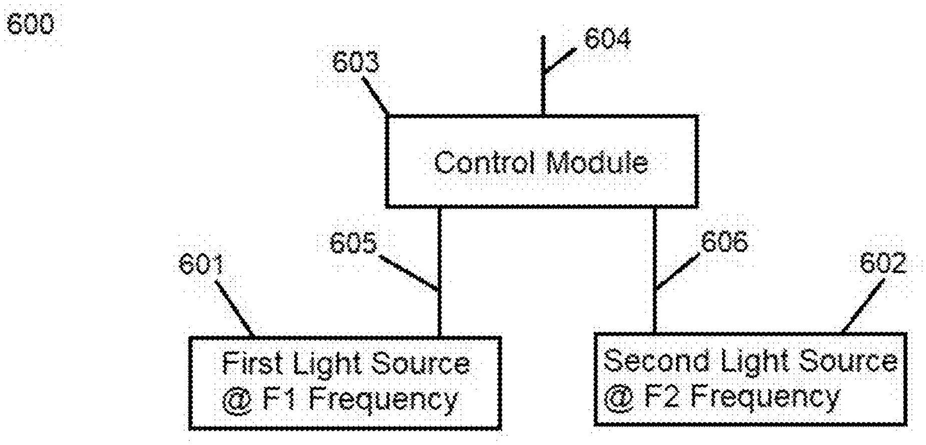
FIG. 6 schematically depicts an embodiment of the present disclosure with two light sources operating at different frequencies.

FIG. 6 is another embodiment 600 of the lighting apparatus of the present disclosure. The first light source 601 comprises 4000K LED's and the second light source 602 also comprises 4000K LED's. Control module 603 operates the first light source 601 at 120 Hz and the second light source 602 at 80 Hz. Two light sources 601,602 generate the same amount of light output, thus there is no light output difference between the two light sources.

Figure 7:
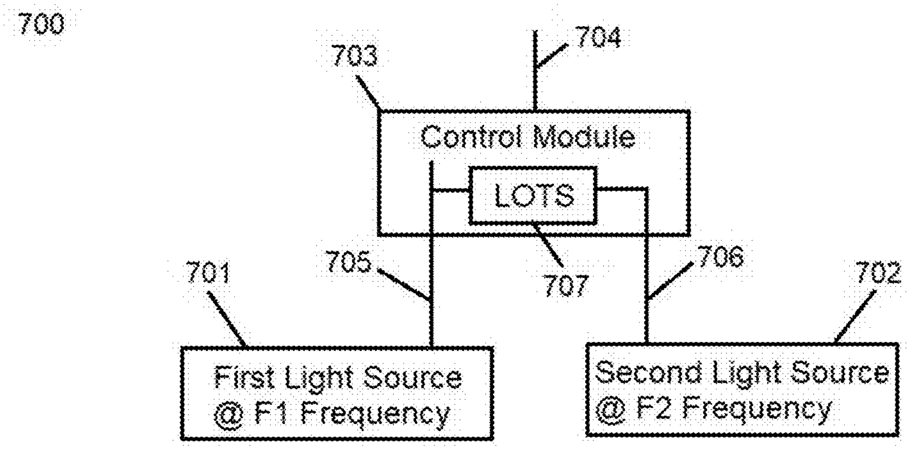
FIG. 7 schematically depicts another embodiment of the present disclosure having a light output tuning submodule (LOTS) with two light sources operating at different frequencies.

FIG. 7 is another embodiment 700 of the lighting apparatus of the present disclosure. The first light source 701 comprises 3800K LED's and the second light source 702 comprises 4200K LED's. Control module 703 operates the first light source 701 at 120 Hz and the second light source 702 at 80 Hz. The efficacy of the second light source 702 is 3% higher than that of the first light source 701. LOTS module 707 reduces the power supply 706 to the second light source 702 by 3% as compared to the power supply 705 to the first light source 701. As a result, the light output of the first light source 701 will be within 1% difference to the light output of the second light source 702.

Figure 8:
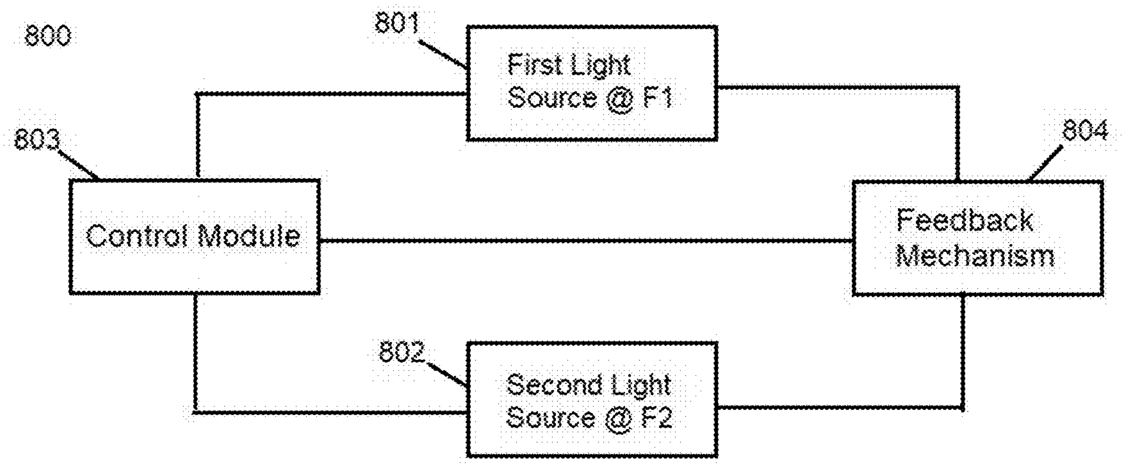
FIG. 8 schematically depicts another embodiment of the present disclosure having a feedback mechanism with two light sources operating at different frequencies.

FIG. 8 is a generic embodiment 800 of the present disclosure with a feedback mechanism. Control module 803 operates the first light source at 120 Hz and the second light source at 80 Hz. A feedback mechanism 804 is used to sense a first representation of the light output of the first light source 801 and a second representation of the light output of the second light source 802. The feedback mechanism is further configured to derive the difference between the first representation and the second representation and feedback a signal proportional to the difference to the control module 803. In response to the signal from the feedback mechanism 804, control module 803 is configured to tune the light output of the first light source 801 and the light output of the second light source 802 such that they are within 1% difference.

Figure 9:
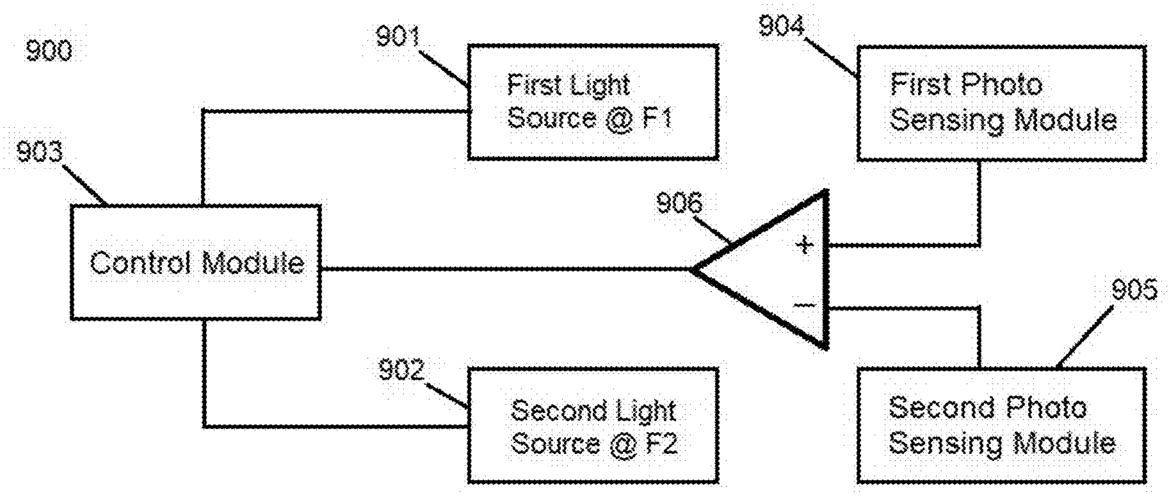
FIG. 9 schematically depicts another embodiment of the present disclosure have two photo sensing modules with two light sources operating at different frequencies.

FIG. 9 is another embodiment of the lighting apparatus of the present disclosure. For embodiment 900, this lighting apparatus uses 3800K LEDs as its first light source 901 and 4200K LEDs as its second light source 902. Control module 903 operates the first light source 901 at 120 Hz and the second light source 902 at 80 Hz. Embodiment 900 uses a first photo sensing module 904 for sensing the light output of the first light source 901 to generate a first signal and a second photo sensing module 905 for sensing the light output of the second light source 902 to generate a second signal. Comparator module 906 receives the first signal and the second signal, generates a third signal proportional to the difference between the first signal and the second signal, and sends the third signal to control module 903. In response to the third signal from the comparator module 906, control module 903 tunes the light output of the first light source 901 or the second light source 902, or both, such that light outputs of the first light source and of the second light source are within 1% difference.

Figure 10:
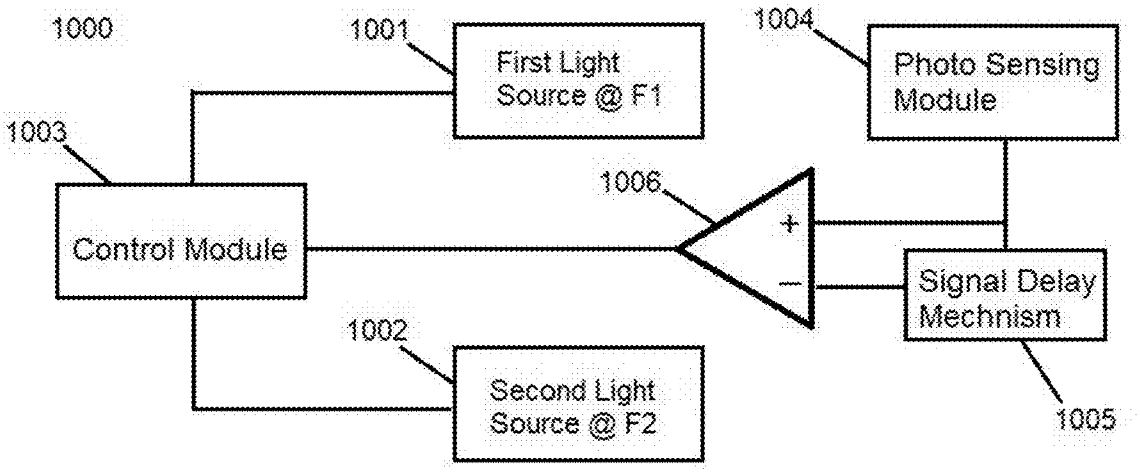
FIG. 10 schematically depicts another embodiment of the present disclosure having one photo sensing module and a signal delay mechanism with two light sources operating at different frequencies.

FIG. 10 is another embodiment of the lighting apparatus of the present disclosure. For this embodiment, it uses 3800K LEDs as its first light source 1001 and 4200K LEDs as its second light source 1002. Control module 1003 operates the first light source 1001 at 120 Hz and the second light source 1002 at 80 Hz. Photo sensing module 1004 senses the light outputs of the first light source 1001 and the light output of the second light source 1002 alternately and generates a first signal corresponding to the light output of the first light source 1001 and the light output of the second light source 1002. The first signal is fed through a signal delay mechanism 1005 for delaying the first signal by a half of the F frequency cycle, i.e., 1/80 second, thus creating a delayed first signal. Comparator module 1006 receives the delayed first signal and the second signal, generates a third signal proportional to the difference between the first signal and the second signal, and feeds the third signal to control module 1003 for tuning the first light source or the second light source, or both, such that light outputs of the first light source and of the second light source are within 1% difference.

Additional and Alternative Implementation Notes

Although the techniques have been described in language specific to certain applications, it is to be understood that the appended claims are not necessarily limited to the specific features or applications described herein. Rather, the specific features and examples are disclosed as non-limiting exemplary forms of implementing such techniques.

As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more," unless specified otherwise or clear from context to be directed to a singular form.

What is claimed is:

1. A lighting apparatus, comprising:

a first light source with a first color temperature (CT1);

a second light source with a second color temperature (CT2) different from the CT1; and a control module configured to operate the lighting apparatus in two modes such that:

in a first mode, the control module operates the lighting apparatus in a first linear combination of the first light source and the second light source, resulting in a first operating color temperature (OCT1) of the lighting apparatus, such that OCT1≈X1*CT1+Y1*CT2, wherein X1+Y1=100%;

in a second mode, the control module operates the lighting apparatus in a second linear combination of the first light source and the second light source different from the first linear combination, resulting in a second operating color temperature (OCT2) of the lighting apparatus different from the first operating color temperature OCT1, such that OCT2≈X2*CT1+Y2*CT2, wherein X2+Y2=100%, X1≠X2, and Y1≠Y2;

wherein:

a difference between the OCT1 and the OCT2 is greater than 100 Kelvin, the control module is configured to alternate an operation of the lighting apparatus between the first mode and the second mode at a frequency F between 30 Hz and 45 Hz, resulting in a blended color temperature of the lighting apparatus equal to (OCT1+OCT2)/2, and light outputs of the lighting apparatus operating in the first mode and in the second mode are within a 3% difference.

2. The lighting apparatus of claim 1, wherein OCT1 equals the CT1 and OCT2 equals CT2.

3. A lighting apparatus, comprising:

a first light source with a first color temperature (CT1);

a second light source with a second color temperature (CT2) different from the CT1; and a control module configured to operate the lighting apparatus in two modes such that:

in a first mode, the control module operates the lighting apparatus in a first linear combination of the first light source and the second light source, resulting in a first operating color temperature (OCT1) of the lighting apparatus, such that OCT1≈X1*CT1+Y1*CT2, wherein X1+Y1=100%;

in a second mode, the control module operates the lighting apparatus in a second linear combination of the first light source and the second light source different from the first linear combination, resulting in a second operating color temperature (OCT2) of the lighting apparatus different from the first operating color temperature OCT1, such that OCT2≈X2*CT1+Y2*CT2, wherein X2+Y2=100%, X1≠X2, and Y1≠Y2;

wherein:

a difference between the OCT1 and the OCT2 is greater than 100 Kelvin, the control module is configured to alternate an operation of the lighting apparatus between the first mode and the second mode at a frequency F between 30 Hz and 45 Hz, resulting in a blended color temperature of the lighting apparatus equal to (OCT1+OCT2)/2, and the control module further comprises a light output tuning submodule (LOTS) configured to tune a light output of the lighting apparatus in either the first mode or the second mode, or both, such that light outputs of the lighting apparatus operating in the first mode and in the second mode are within a 1% difference.

4. The lighting apparatus of claim 3, wherein OCT1 equals the CT1 and OCT2 equals CT2.

5. A lighting apparatus, comprising:

a first light source with a first color temperature (CT1);

a second light source with a second color temperature (CT2) different from the CT1;

a feedback mechanism; and a control module configured to operate the lighting apparatus in two modes such that:

in a first mode, the control module operates the lighting apparatus in a first linear combination of the first light source and the second light source, resulting in a first operating color temperature (OCT1) of the lighting apparatus, such that OCT1≈X1*CT1+Y1*CT2, wherein X1+Y1=100%;

in a second mode, the control module operates the lighting apparatus in a second linear combination of the first light source and the second light source different from the first linear combination, resulting in a second operating color temperature (OCT2) of the lighting apparatus different from the first operating color temperature OCT1, such that OCT2≈X2*CT1+Y2*CT2, wherein X2+Y2=100%, X1≠X2, and Y1≠Y2;

wherein:

a difference between the OCT1 and the OCT2 is greater than 100 Kelvin, the control module is configured to alternate an operation of the lighting apparatus between the first mode and the second mode at a frequency F between 30 Hz and 45 Hz, resulting in a blended color temperature of the lighting apparatus equal to (OCT1+OCT2)/2, the feedback mechanism is configured to sense a first representation of a first light output of the lighting apparatus operating in the first mode, sense a second representation of a second light output of the lighting apparatus operating in the second mode, derive a difference between the first representation and the second representation, and feedback a signal proportional to the difference to the control module, and in response to the signal from the feedback mechanism, the control module is configured to tune the first or second light output of the lighting apparatus in either the first mode or the second mode, or both, such that light outputs of the lighting apparatus operating in the first mode and in the second mode are within a 1% difference.

6. The lighting apparatus of claim 5, wherein the feedback mechanism comprises:

a first sensing module configured to sense the first representation of the first light output of the lighting apparatus operating in the first mode;

a second sensing module configured to sense the second representation of the second light output of the lighting apparatus operating in the second mode; and a comparator module configured to receive the first representation and the second representation to generate the signal proportional to the difference of the first representation and the second representation and to feedback the signal to the control module.

7. The lighting apparatus of claim 5, wherein the feedback mechanism comprises:

a sensing module;

a signal delay mechanism; and a comparator module, wherein:

the sensing module senses representations of the light outputs of the lighting apparatus operating in the first mode and in the second mode alternately, and generates a first signal corresponding to the first representation of the first light output of the lighting apparatus operating in the first mode and a second signal corresponding to the second representation of the second light output of the lighting apparatus operating in the second mode, the first signal is fed through the signal delay mechanism which delays the first signal by a half of the F frequency cycle, thus creating a delayed first signal, and the comparator module receives the delayed first signal and the second signal, generates a third signal proportional to the difference of the first representation and the second representation, and provides the third signal to the control module.

8. The lighting apparatus of claim 5, wherein OCT1 equals the CT1 and OCT2 equals CT2.

9. A lighting apparatus, comprising:

a first light source;

a second light source; and a control module, wherein:

the control module is configured to simultaneously operate the first light source at a F1 frequency with a first light output LO1 and the second light source at a F2 frequency (F2≠F1) with a second light output LO2, and LO1 and LO2 are within a 3% difference.

10. The lighting apparatus of claim 9, wherein the first light source and the second light source emit a same color temperature.

11. The lighting apparatus of claim 9, wherein F1≥60 Hz, and F2 is ≥60 Hz.

12. The lighting apparatus of claim 9, wherein the difference between F1 and F2 is between 30 Hz to 45 Hz.

13. A lighting apparatus, comprising:

a first light source;

a second light source; and a control module, wherein:

the control module is configured to simultaneously operate the first light source at a F1 frequency with a first light output LO1 and the second light source at a F2 frequency (F2≠F1) with a second light output LO2, and the control module comprises a light output tuning submodule (LOTS) configured to tune LO1 or LO2, or both, such that LO1 and LO2 are within a 1% difference.

14. The lighting apparatus of claim 13, wherein F1≥60 Hz, and F2 is ≥60 Hz.

15. The lighting apparatus of claim 13, wherein the difference between F1 and F2 is between 30 Hz to 45 Hz.

16. A lighting apparatus, comprising:

a first light source;

a second light source;

a control module; and a feedback mechanism, wherein:

the control module is configured to operate the first light source at a F1 frequency with a first light output LO1 and the second light source at a F2 frequency (F2≠F1) with a second light output LO2 simultaneously, the feedback mechanism is configured to sense a first representation of LO1, sense a second representation of LO2, derive a difference between the first representation and the second representation, and feedback a signal proportional to the difference to the control module, and in response to the signal from the feedback mechanism, the control module is configured to tune LO1 or LO2, or both, such that LO1 and LO2 are within a 1% difference.

17. The lighting apparatus of claim 16, wherein the feedback mechanism comprises:

a first sensing module configured to sense the first representation of LO1;

a second sensing module configured to sense the second representation of LO2; and a comparator module configured to receive the first representation and the second representation to generate a signal proportional to a difference of the first representation and the second representation and to forward the signal to the control module.

18. The lighting apparatus of claim 16, wherein the feedback mechanism comprises:

a sensing module;

a signal delay mechanism; and a comparator module, wherein:

the sensing module senses representations of LO1 and LO2 alternately and generates a first signal corresponding to the first representation of LO1 and a second signal corresponding to the second representation of LO2;

the first signal is fed through the signal delay mechanism which delays the first signal, thus creating a delayed first signal, and the comparator module receives the delay first signal and the second signal, generates a third signal proportional to the difference of the first representation and the second representation, and forwards the third signal to the control module.

19. The lighting apparatus of claim 16, wherein F1≥60 Hz, and F2 is ≥60 Hz.

20. The lighting apparatus of claim 16, wherein the difference between F1 and F2 is between 30 Hz to 45 Hz.

* * * * *